Patented Oct. 11, 1932

1,882,112

UNITED STATES PATENT OFFICE

ALBERT RENÉ BOIDIN, OF SECLIN, AND IVAN AUGUSTE EFFRONT, OF MARCQ EN BAROEUL, FRANCE

MANUFACTURE OF PROTEOLYTIC ENZYMES BY MEANS OF MICROORGANISMS

No Drawing. Application filed June 7, 1929, Serial No. 369,257, and in France June 18, 1928.

As early as 1885, Procter showed in his textbook on tanning, that the bacteria which secrete proteolytic enzymes play a predominating part in the bating or in the puering of the skins.

This discovery has been the starting point for a number of processes aiming at the replacement of the dungbates by active substances secreted by bacteria or moulds.

As the bating does not result from the direct action of organized microorganisms on the skin, because it is only the outcome of the dissolution of certain parts of the skins by the enzymes secreted by these microorganisms, it appears that nutritive medium, on which the proteolytic agents have been cultivated may be freed from these microorganisms by means of filtration or otherwise, without losing its activity or its value.

It has also been known for a long time that the microorganisms specially suitable for the production of enzymes belong to the family of bacillus subtilis, which comprises besides bacillus subtilis, bacillus mesentericus, tyrothrix, and so on and to the family of hyphomycetes, of which: aspergillus niger, aspergillus orizæ and aspergillus flavus are the more often used.

Many methods of cultivation of the bacteria and of the moulds have been made the object of patents.

The proteolytic products obtained by these different processes were relatively poor in active substances, hence the necessity of concentrating them, and this concentration of the enzymatic solutions was expensive because of the quantity of fuel used and partial loss of activity caused by the heat. The enrichment of the product by precipitation of the enzymes also led to a loss of a part of these enzymes. As a matter of fact the stability of these products either in solution or in the state of a powder was far from satisfactory.

The object of the present invention is the obtaining, by direct means, of excellent and commercial enzymatic preparations of satisfactory stability in the liquid state, as well as in the state of powder; this discovery is being based on the following results of our experiments.

1. It has been proved by us that it is useful that the nutritive medium be relatively rich in carbohydrates more or less hydrolyzed and that the best results are obtainable by 20 to 50 grams of carbohydrates per liter. As carbohydrates we may use starches, dextrine, dextrose, lactose, cane sugar, pentoses, and we may also use to get the same results molasses, whey (preferably freed from casein) and polyalcohols, such as glycerin.

These substances or a mixture of two or more of them undergo, during the fermentation by the microorganisms, partial modifications which render the enzymatic product more durable. Inasmuch as, during the development of these microorganisms in a culture without additional carbohydrates, the tendency is toward the alkaline side, the formation of the acid products from these added carbohydrates will facilitate the keeping of the pH in the acid region in the vicinity of neutrality between pH 6 and pH 7.

2. It must be noted that to get a strong proteolytic enzyme it is necessary to lessen the percentage of the nutritive medium in protein-derived nitrogen, whilst for the production of amylolytic enzymes the use of proteins has only the disadvantage of increasing the cost-price. For this last reason the media heretofore used generally contained 8 to 10 grams or more of protein-derived nitrogen per liter. On the contrary, we have been able to reduce the proportion of organic nitrogen to 4 grams, 2 grams and even less than 1 gram per liter, and the organic nitrogen can be replaced by inorganic nitrogen.

3. It has also been found that to get good proteolytic enzymes it is necessary that the nutritive medium be enriched in earthalkaline salts, like calcium chloride, calcium sulphate or the same magnesium salts. We have found that these salts possess the property of stimulating the secretion of proteolytic enzymes by the microorganisms, the best proportion varying between 5 to 10 grams of sulphate of magnesia per liter, for instance.

4. The growth of the microorganisms and the production of enzymes are dependent on aeration, the secretion of enzymes being increased when aerating under pressure; for example, by submitting culture apparatus to a pressure of one to fifteen lbs. per square inch. We have found that when producing rapid fluctuations in the pressure and when even alternately working under pressure and under vacuum, the respiration of the microorganism and the elimination of the volatile substances are stimulated and thus the secretion of enzymes is accelerated.

The process may be carried out by different means. We give below two means which are mentioned only by way of example:

*a.* We may utilize as nutritive raw material oil cakes; such as peanut cakes, soja cakes, cottonseed-cakes, linseed cakes, which are poor in non-nitrogenated extractive substances and very rich in proteins. For this purpose we prepare a thick mash of 1.000 liters, for example, containing 50 kilograms of cakes and 250 to 300 liters of water; the proteins being brought into solution either by submitting the mash to a lactic fermentation during 24 to 48 hours at a temperature of 50° to 55° C., or in adding to the mash a small proportion of an inorganic acid (one liter of sulphric acid, for instance) and heating in the vicinity of the boiling point or under pressure. By these means the organic nitrogen passes into soluble form. (See for the details the French Patents No. 563,932 of 1922 and No. 570,307 of 1923).

The mash is filtered and neutralized by means of soda or ammonia, 10 to 20 kilograms of alkaline or earthalkaline phosphates are added (we may use up to 40 kilograms of sodium and potassium phosphate. We also add 5 to 10 kilograms of sulphate of magnesia and an equal quantity of ammonium sulphate, and 40 kilograms of solubilized starch or dextrin. Water is added in order to make up a thousand liters and the whole is sterilized under pressure in the apparatuses described in the French patents No. 563,932 of 1922 and No. 570,307 of 1923 and according to the methods indicated in these patents. The mash is inoculated with a pure culture of the selected microorganisms and actively aerated. The fermentation usually lasts from 48 to 72 hours. The mash is then filtered or decanted and suitable antiseptics are added; for example 1 per cent of formaldehyde or one half to one per cent of carbolic acid or two per thousand of cresol.

*b.* In the foregoing example we may replace the peanut cake by the steep water of the softening of the barley in the malting process of the first steep water coming from the softening of manioca or of other grains used in the starch industry. Although poor in proteins, these steep waters furnish very good enzymatic products if we add to them the quantity of salts and carbohydrates above mentioned.

In the above examples, we may modify the quantities of the different ingredients without loss of good results. Nevertheless, it is advisable not to change too much the proportions of carbohydrates and earthalkaline salts, because the fermented medium would become too alkaline and the proteolytic power would be reduced accordingly.

By adhering to the indicated proportions, however, the production of the proteolytic power reaches its maximum, as before pointed out. As a matter of fact, whilst the mashes made in the usual way from peanut cakes or soja cakes, produced enzyme solutions which would solubilize on an average half their weight of casein in one hour at 40° C., the solutions prepared according to the method above described will liquefy from 3 to 6 times their weight of casein under the same conditions.

It is worthy of note that each of the means above mentioned partially contributes to improve the resulting product and that by using them all together we get, from the point of view of the proteolytic power, a yield which may reach 5 to 10 times the yield obtained by the ordinary methods and hence a considerable saving in the cost-price.

Because of the increase in strength of the bates so obtained, as well as the fact that our solutions do not contain any putrefactive ferment and, what is more, exercise a destructive action on the agents of putrefaction, it is possible to modify in several ways the methods in use for the depilation and the bating of skins. We may, if we operate according to one of the old methods at a temperature of 37–40° C. for the bating or at 25° C. for the depilation reduce from one half to two thirds the quantity of the bate to be utilized in comparison with the pancreatic bates of ordinary strength. We may also use the quantities previously employed and reduce the duration of the action, or what is far better, we may operate with the quantities and according to the methods previously in use but lower the temperature near 28°–30° C. for the bating or near 15°–17° C. for the depilation, which is the optimum as it makes it possible to reduce the loss in hide-substance.

The enzymes obtained as above described may be utilized by any of the known methods, depending upon the use to which the enzymes are to be put. We will mention one example:

The skins, nearly neutralized, are as usual steeped in four times their weight of water. The proportion of enzymatic product to be used will vary, from 0.1 to 1% of the weight of the skins, depending on the nature and origin of the skins, for instance sheep skins, calf skins, goat skins, etc. The temperature of the bating bath will be maintained from about 25° to 40° C. and from about 15° to 25° C. for the depilating bath. The time of treatment will vary from 1 to 24 hours according to the skins, the preferred method being to treat until the desired degree of suppleness has been attained.

Amongst the advantages resulting from the use of the product obtained by this process may be mentioned the following:

a—the lessening of the cost-price of the bates, b—the production of a regular bating without smells, and elimination of any danger of damage of the leather by putrefaction or by overbating, c—the increase in the yield in leather by being able to operate at low temperatures, at the will of the operator.

Claims:

1. The process for manufacturing proteolytic enzymes by means of microorganisms, consisting in preparing a sterile nutritive medium containing a weak quantity of nitrogenous matter and proportionally a larger quantity of carbohydrates, about 20 parts of carbohydrates for 1 part of organic nitrogen, adding to from 5 to 10 grams per liter of alkaline or earth-alkaline salts so as to keep the pH of the medium between 5.5 to 7, inoculating said medium with a pure culture of microorganisms of the bacillus subtilis family, and allowing said culture to grow in said medium under an active aeration and subjecting said medium to sudden and alternative variations of pressure, high pressure being followed by partial vacuum in order to facilitate the secretion of enzymes.

2. The process for manufacturing proteolytic enzymes by means of microorganisms, consisting in preparing a sterile nutritive medium containing a weak quantity of nitrogenous matter and proportionally a larger quantity of carbohydrates, about 20 parts of carbohydrates for 1 part of organic nitrogen, adding to from 5 to 10 grams per liter of alkaline or earth-alkaline salts so as to keep the pH of the medium between 5.5 to 7, inoculating said medium with a pure culture of microorganisms of the bacillus subtilis family, and allowing said culture to grow in said medium under an active aeration and subjecting said medium to sudden and alternative variations of pressure, high pressure being followed by partial vacuum in order to facilitate the secretion of enzymes and keeping enzymes free from microorganisms by physical means.

In testimony whereof we have hereunto affixed our signatures.

ALBERT RENÉ BOIDIN.
IVAN AUGUSTE EFFRONT.